(12) United States Patent
Pimenova et al.

(10) Patent No.: US 9,276,960 B2
(45) Date of Patent: Mar. 1, 2016

(54) POLICY PARTIAL RESULTS (71) Applicant: Facebook, Inc., Menlo Park, CA (US)

(72) Inventors: Maria S. Pimenova, Mountain View, CA (US); Wendy Weihuan Mu, Menlo Park, CA (US); Dwayne Lloyd Reeves, Mountain View, CA (US); Kendall Blair Hopkins, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 3 days.

(21) Appl. No.: 14/243,167

(22) Filed: Apr. 2, 2014

(65) Prior Publication Data

US 2015/0288718 A1    Oct. 8, 2015

(51) Int. Cl.
*H04L 29/06*    (2006.01)

(52) U.S. Cl.
CPC ............... *H04L 63/20* (2013.01); *H04L 63/10* (2013.01)

(58) Field of Classification Search
CPC ..................... H04L 63/20; H04L 63/10
See application file for complete search history.

(56) References Cited

U.S. PATENT DOCUMENTS

| 8,407,789 B1 | 3/2013 | Mears et al. | |
| 8,417,654 B1* | 4/2013 | Cao et al. | 706/14 |
| 8,478,707 B1* | 7/2013 | Ong et al. | 706/47 |
| 9,009,780 B2 | 4/2015 | Reeves et al. | |
| 2007/0150429 A1* | 6/2007 | Huelsman et al. | 706/47 |
| 2009/0193493 A1 | 7/2009 | Becker et al. | |
| 2009/0222393 A1 | 9/2009 | Ganai | |
| 2009/0254638 A1* | 10/2009 | Spatscheck et al. | 709/220 |
| 2009/0326907 A1 | 12/2009 | Gulwani et al. | |
| 2010/0192130 A1 | 7/2010 | Hawblitzel et al. | |
| 2012/0017260 A1 | 1/2012 | Narain et al. | |
| 2012/0192290 A1 | 7/2012 | Barefoot et al. | |
| 2012/0278700 A1* | 11/2012 | Sullivan et al. | 715/235 |
| 2013/0212266 A1 | 8/2013 | Lyon et al. | |
| 2014/0006522 A1 | 1/2014 | Syrowitz et al. | |
| 2014/0282837 A1 | 9/2014 | Heise et al. | |

OTHER PUBLICATIONS

Co-Pending U.S. Appl. No. 14/341,028 by Hopkins, K. et al., filed Jul. 25, 2014.
Notice of Allowance mailed Feb. 3, 2015, for U.S. Appl. No. 13/842,185 by Heise, S. et al., filed Mar. 15, 2013.
Co-Pending U.S. Appl. No. 13/842,185 by Heise, S. et al., filed Mar. 15, 2013.

(Continued)

*Primary Examiner* — Andrew Nalven
*Assistant Examiner* — Mary Li
(74) *Attorney, Agent, or Firm* — Perkins Coie LLP (57) ABSTRACT

Technology for policies with reduced associated costs is disclosed. A policy may include an ordered rule set. When evaluated, the highest priority rule in the order that does not skip may control the policy outcome. Rules within a policy may have associated costs, such as data fetch and evaluation costs. In some contexts, it may be less important to evaluate every rule than to evaluate the policy quickly. Reduced policies that have one or more rules removed or that skip evaluation of some rules may be created for these contexts. When a rule of a policy is skipped, it may result in a possibility of a false allow or false deny. In some cases, rules may be duplicative. Removal or skipping of duplicative rules does not increase the possibility of a false allow or false deny. By using reduced policies in identified contexts, policy evaluation costs may be reduced.

18 Claims, 9 Drawing Sheets

(56) References Cited

OTHER PUBLICATIONS

Co-Pending U.S. Appl. No. 14/152,109 by Yung, R. et al., filed Jan. 10, 2014.
Co-Pending U.S. Appl. No. 14/274,460 by Sethi, B. et al., filed May 9, 2014.
Jayaraman et al., "Automatic Error Finding in Access-Control Policies", *CCS'11*, Oct. 17-21, 2011, 12 pages, ACM 978-1-4503-0948-6/11/10, Chicago, IL.
"Mohawk: A tool for verifying access-control policies", Retrieved from https://code.google.com/p/mohawk/ on Mar. 7, 2013, 1 page.
"Papers and Talks", Retrieved from https://sites.google.com/site/jeevesprogramming/applications on Mar. 7, 2013, 3 pages.
"Satisfiability Modulo Theories", Retrieved from http://en.wikipedis.org/wiki/Satisfiability_Modulo_Theories on Mar. 7, 2013, 7 pages.
Swamy et al., "Secure Distributed Programming with Value-Dependent Types", ICFP'11, Sep. 19-21, 2011, 13 pages, ACM 978-1-4503-0865-6/11/09, Tokyo, Japan.
"The Margrave Policy Analyzer", Retrieved from http://www.margrave-tool.org on Mar. 7, 2013, 2 pages.
Yang et al., "A Language for Automatically Enforcing Privacy", 31 pages, POPL/CSAIL.
Yang et al., "A Language for Automatically Enforcing Privacy", Talk given on Mar. 28, 2012, 56 pages, Jeeves/CSAIL.
Yang et al., "A Language for Automatically Enforcing Privacy", Talk given on Jul. 27, 2011, 42 pages, Google NYC/CSAIL, New York, NY.
Yang et al., "A Language for Automatically Enforcing Privacy Policies", POPL'12, Jan. 25-27, 2012 12 pages, ACM 978-1-4503-1083-3/12/01, Philadelphia, PA.
Yang et al., "Safe to the Last Instruction: Automated Verification of a Type-Safe Operating System", *PLDI'10*, Jun. 5-10, 2010, 12 pages, ACM 978-1-4503-0019/10/06, Toronto, Ontario, Canada.
Non-Final Office Action mailed Aug. 22, 2014, for U.S. Appl. No. 13/842,185 by Heise, S. et al., filed Mar. 15, 2013.
Non-Final Office Action mailed Dec. 3, 2015 for U.S. Appl. No. 14/152,109 by Yung, R. et al., filed Jan. 10, 2014.
Restriction Requirement mailed Dec. 4, 2015, for U.S. Appl. No. 14/274,460 by Sethi, B., et al., filed May 9, 2014.

* cited by examiner

Privacy Policy for Image Company_Picnic.jpg

| Priority | Name | Type | Probability | Data Fetch Cost | Evaluation Cost |
|---|---|---|---|---|---|
| 1 | AllowIfAdmin | A-o-S | 2% | 0 | 10 |
| 2 | AllowIfReceivedShare | A-o-S | 10% | 2 | 20 |
| 3 | DenyIfNotInGroupCompanyC | D-o-S | 23% | 4 | 25 |
| 4 | AllowIfInGroupExecutives | A-o-S | 15% | 8 | 12 |
| 5 | DenyAll | D | 41% | 0 | 2 |

*FIG. 8*

| Privacy Policy for Image Company_Picnic.jpg | | | | | | |
|---|---|---|---|---|---|---|
| Priority | Name | Type | Probability | Data Fetch Cost | Evaluation Cost | Skip Context |
| 1 | AllowIfAdmin | A-o-S | 2% | 0 | 10 | |
| 2 | AllowIfReceivedShare | A-o-S | 10% | 2 | 20 | News |
| 3 | DenyIfNotInGroupCompanyC | D-o-S | 23% | 4 | 25 | Timeline |
| 4 | AllowIfInGroupExecutives | A-o-S | 15% | 8 | 12 | Timeline, Search |
| 5 | DenyAll | D | 41% | 0 | 2 | |

*FIG. 9*

POLICY PARTIAL RESULTS

BACKGROUND

As the Internet becomes integrated into almost every aspect of people's lives, the amount of content available is growing at an exponential rate. It is common for web providers to operate databases with petabytes of data, while leading content providers are already looking toward technology to handle exabyte implementations.

In addition, the tools used to access this vast resource are growing ever more sophisticated. Although users may believe that they are simply logging into a website, sophisticated server software may search through vast stores of data to gather information relating to the users, for example based on their browsing history, preferences, data access permissions, relationships, location, demographics, etc. Simultaneously, the server may build a custom interface for users, e.g., using server-side languages. Building this interface may include selecting hundreds of content items, such as images, video clips, animation, applets, and scripts. In some cases, these content items may be selected from among a vast array of potential content items based on various policies, e.g., data access policies, privacy policies, optimization policies, etc. (collectively, "policies"). Some of these policies are implemented by software developers whereas other data can be provided by users.

These policies can be useful in social networking websites, e.g., to determine what personal, advertising, or other content to display to users, to determine what actions users can take, etc. Analysis of all of the relevant policies to determine what subset of data to analyze and present can take considerable time. However, unless this process occurs with no perceptible delays, users may lose patience and simply navigate to a different website. Therefore, efficiently determining what content will be gathered and how it may be presented is desirable to reduce website delays caused by analyzing policies.

DETAILED DESCRIPTION

Technology for reducing delays corresponding to implementing policies is disclosed. Policies can be provided by software developers, e.g., in conjunction with code they provide to determine what data is to be analyzed or presented to users. Policies can also (or instead) be specified by users, e.g., to indicate what data is to be shared or not shared with others. When evaluated, a policy may make a determination regarding whether a particular action should occur with respect to a particular object. For example, a viewing user may access a webpage that may include various objects (e.g., photos, posts, comments, etc., posted by other users). One or more policies may be associated with one or more of the various objects. For example, a photo may be associated with a policy that determines whether a viewing user can view the photo based on the privacy settings set by a user who published the photo. A web server may evaluate each policy for each object to determine whether the content should be included or excluded for viewing by the viewing user. Multiple such policies may need to be evaluated before determining whether to include or exclude the object. When these evaluations are performed for a large number of concurrent viewing users (e.g., millions of concurrent viewing users) using a given pool of computational resources, the latency in obtaining an outcome for a particular object for a particular viewing user may be large. The embodiments disclosed herein provide techniques to reduce the rules that may need to be evaluated for a policy to return a result, while maintaining an acceptable level of accuracy. This allows the latency in obtaining an outcome for a particular object for a particular viewing user to be reduced. In doing so, the overall user experience for all viewing users is improved.

In some embodiments, policies include ordered sets of rules. Each rule in a policy may comprise a condition and a corresponding type. In some embodiments, the types may be binary and may correspond to allow-or-skip and deny-or-skip types. An allow-or-skip type indicates that the rule applies by allowing a particular action if its condition is true. A deny-or-skip type indicates that the rule applies by denying a particular action if its condition is true. Both allow-or-skip and deny-or-skip rules do not apply and are skipped if their condition is false. A policy may be implemented such that the "highest" rule that applies (does not skip) in an ordering of the rules controls the outcome of policy. Thus, for example, if a policy has one allow-or-skip rule and one deny-or-skip rule and the corresponding conditions of both the two rules evaluates to true, then the content will be displayed if the allow-or-skip rule is higher in the order than the deny-or-skip rule but the content will not be displayed if the deny-or-skip rule is higher in the order than the allow-or-skip rule. In some implementations, a policy may have non-binary rules or more than two types. For example, a policy may have deny-always or allow-always type rules; a policy may have rules with possible outcomes of allow, deny, skip, and call alternate function; or a policy may have allow-or-skip, deny-or-skip, and revert-to-subsequent-liner-execution-or-skip type rules.

Rules within a policy may have associated costs that are incurred, e.g., when the rules are evaluated, and these costs may vary greatly. The costs can relate to resource costs typically associated with computing, e.g., processor use, network latency, disk latency, etc. For example, an allowAdministrators rule may have a very low cost of retrieving the current user's rights level and determining if that rights level is administrator, whereas a denyIfNotFriendOfFriend rule may have a much higher cost of performing a complicated query to retrieve a large list of all friends of friends, which may then have to be searched to determine if it contains the current user. In addition, rules may have associated probabilities of applying (e.g., not skipping). For example, the allowAdministrators rule may have a very low probability of applying because only a few administrators, as compared to normal users, may be registered on a system. Conversely, a denyAlways rule may have a much higher probability of applying whereas some of the previous rules in the policy may have a lower probability of applying.

In some situations, it may be less important for a policy to evaluate every rule than for the policy to evaluate quickly. In certain situations it may be preferable to have a policy evaluate more quickly and sometimes return a "false deny." A false deny is a result where a reduced policy returns a deny result where evaluation of the entire policy would have resulted in an allow. In effect, when a policy results in a false deny, associated content may not be shown to a user when the user actually has permissions to see the content. A reduced policy may result in a false deny when a reduced policy is created by removing one or more rules that may result in an allow. For example, a policy may have five binary rules with associated costs values ("c") as follows: allowAdministrators—c:2, denyUnder21—c:5, allowMembers—c:9; denyBlacklist—c:12; allowGuests—c:15, and denyAll—c:1. If a reduced policy is created with the allowGuests rule removed, in instances of evaluation of the reduced policy for a particular user, where none of the first five rules apply, (e.g., the user is not an administrator, is over 21, is not a member, is not blacklisted, and is not a guest), the cost of evaluating the reduced policy will be 29, as opposed to the cost of 44 for evaluating the policy with the allowGuests rule. However, if the reduced policy is evaluated for a particular user where the first four rules do not apply, but where the user is a guest, the guest will get a false deny. Similarly, creating a reduced policy by removing a rule that may result in a deny when the reduced policy is evaluated may result in a false allow. False allows may impose a security risk as their effect is providing a content item to a user who does not have permission to access that content item.

Once a first rule is removed, additional rules in the policy may be duplicative of another rule left in the policy, and therefore the additional rules are no longer necessary. By removing these additional rules, the cost of evaluating the reduced policy is decreased without the likelihood of a false deny or false allow increasing. As used herein, one or more rules whose removal may increase the possibility of a false deny or false allow are referred to as "candidate" rules. A system may select a group of one or more candidate rules to analyze for creation of a reduced policy, which is referred to herein as a "candidate rule set." In addition, a "cascade" rule is any additional rule that, as a result of the removal of one or more candidate rules and/or as a result of the removal of one or more other cascade rules, is now duplicative, meaning its removal will not affect the potential for false allows or false denies. The iterative set of cascade rules that may be removed due to the removal of a set of candidate rules is referred to herein as a "cascade rule set." In some cases, a cascade rule set may contain no rules, as removal of a candidate rule set may not render any other rules duplicative.

To illustrate a cascade rule, using the above example, if a reduced policy is created by removing the allowGuests rule, the denyBlacklist rule becomes duplicative of the denyAll rule. This is because once the allowGuests rule is removed, no matter the outcome of the denyBlacklist rule, if a user is not an administrator and is not a member, they will necessarily be denied by at least the denyAll rule. Therefore, if the allowGuests rule is removed, the now duplicative denyBlacklist rule may also be removed without increasing the risk of false allows or false denies. In this example the removed allowGuets rule is the candidate rule and the denyBlacklist rule is a cascade rule.

The trade-off of absolute accuracy in policy evaluation for reduced cost may be desirable when many possible "pieces" of content (e.g., of various types: text, images, messages, etc.) are available for a particular context and it is not essential that users in that context see every item to which they have access. For example, a social networking website may have an auto-complete feature that shows the eight most likely entries that match a first part of a user's input. The candidates for the auto-complete results must be selected very quickly but may also match many thousands of content items, each of which may be associated with various policies to be evaluated before that item may be displayed in the auto-complete area. In this situation, it may be preferable to use faster reduced policies to select the eight content items quickly, instead of evaluating the complete policy for each potential content item, even though this may result in some items being excluded from the auto-complete results that the user actually has access to.

Reduced policy creation may be performed with a set of parameters including reduction parameters and policy conditions. As used herein, "reduction parameters" define a desired result for a reduced policy. As examples, a set of reduction parameters may specify that the reduced policy should reduce maximum or expected execution cost by a particular percentage, that the maximum or expected execution cost should be below a particular value, or that a threshold of cost savings or cost savings versus increased likelihood of false allow or false deny qualifies a rule for removal if reached. In addition, as used herein, "policy conditions" are a type of parameter that specifies a rule that may not be violated in creating a reduced policy. As examples, policy conditions may specify that a maximum number or percentage of rules may be removed; that particular rules or particular types of rules may not be removed; or that as many rules as necessary may be removed to minimally meet the reduction parameters. A particular policy may be used to create multiple reduced policies with different sets of reduction parameters and/or policy conditions which may be appropriate for various circumstances. Parameters may also comprise additional information, such as a particular situation or context in which the other parameters apply. For example, a condition parameter may specify that one or both of the associated reduction parameters and policy conditions apply to a news feed section of a website.

In some embodiments, a reduced policy need only be created once, and can be created "offline" prior to a call for evaluation of the policy. For example, when a policy is created, an optimization script may be run on the policy to create reduced policies that can be substituted for the full policy in certain situations. Reduced policy creation may entail creating copies of the policy or storing an indication that particular rules may be skipped in particular circumstances. As used herein, variations on "removal" of a rule may refer to actual deletion of a rule, creation of a new set of rules which exclude the removed rule, or storing of an indication that the removed rule does not apply or should be skipped in one or more particular circumstances. The reduced policy may then be incorporated in web server code responsive to user content requests. In some embodiments, reduced policies may be further optimized into ordered sets of batches. Such optimization is discussed in further detail in U.S. patent application Ser. No. 14/152,109, which is incorporated in its entirety herein by reference.

Figure 1:
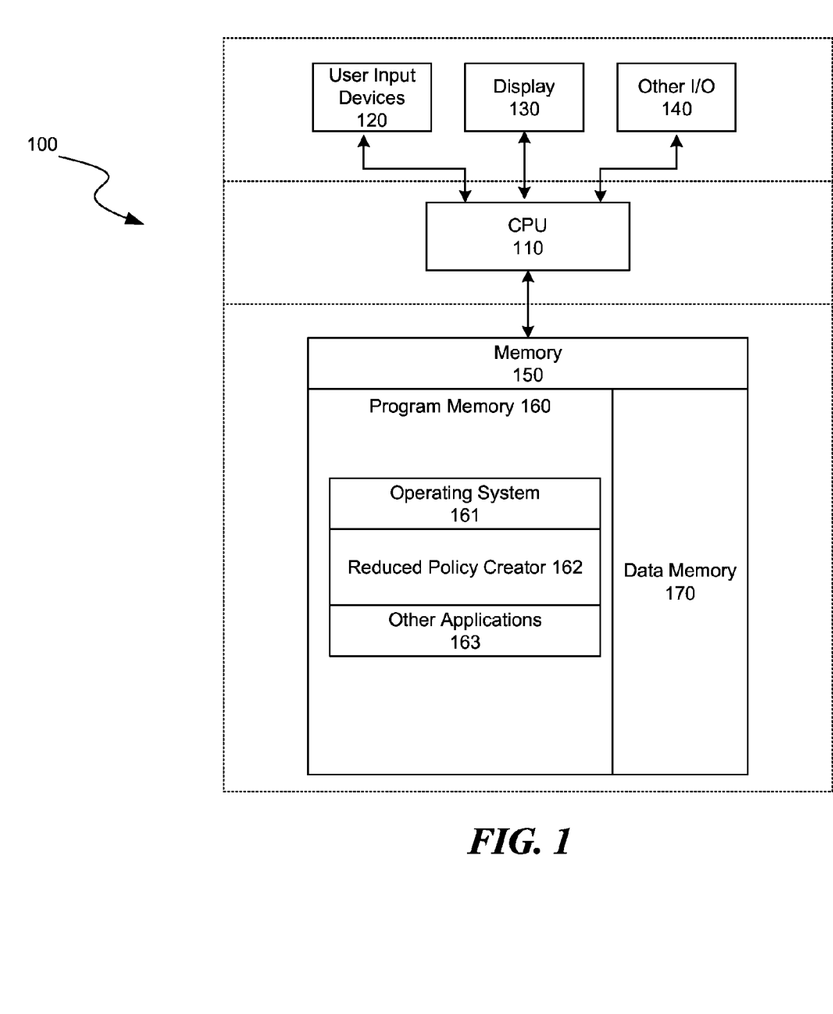
FIG. 1 is a block diagram illustrating an overview of devices on which some embodiments of the disclosed technology may operate.

Several embodiments of the described technology are discussed below in more detail in reference to the Figures. Turning now to the Figures, FIG. 1 is a block diagram illustrating an overview of devices 100 on which some embodiments of the disclosed technology may operate. The devices may comprise hardware components of a device 100 for implementing a policy evaluation optimization system. Device 100 includes one or more user input devices 120 that provide input to the CPU (processor) 110, notifying it of actions performed by a user. The actions are typically mediated by a hardware controller that interprets the signals received from the input device and communicates the information to the CPU 110 using a known communication protocol. Input devices 120 include, for example, a mouse, keyboard, a touchscreen, an infrared sensor, a touchpad, wearable input devices, a camera or image-based input device, microphone, or other user input devices.

CPU 110 may be a single processing unit or multiple processing units in a device or distributed across multiple devices. CPU 110 may be coupled to other hardware devices, for example, with the use of a BUS, such as a PCI BUS or SCSI BUS. The CPU 110 may communicate with a hardware controller for devices such as for a display 130. Display 130 may be used to display text and graphics. One example of a display 130 is a touchscreen that provides graphical and textual visual feedback to a user. In some implementations, the display includes the input device as part of the display, such as when the input device is a touchscreen. In some implementations, the display is separate from the input device. Examples of standalone display devices are: an LCD display screen, an LED display screen, a projected display (such as a heads-up display device), and so on. Other I/O devices 140 may also be coupled to the processor, such as a video or audio card, USB or other external devices, printer, speakers, CD-ROM drive, DVD drive, disk drives, or Blu-Ray devices. In some implementations, other I/O devices 140 also include a communication device capable of communicating wirelessly or wire-based with a network node. The communication device may communicate with another device or a server through a network using, for example, TCP/IP protocols. For example, device 100 may utilize the communication device to distribute operations across multiple network devices.

The processor 110 has access to a memory 150. A memory includes one or more of various hardware devices for volatile and non-volatile storage, and may include both read-only and writable memory. For example, a memory may comprise random access memory (RAM), read-only memory (ROM), writable non-volatile memory, such as flash memory, hard drives, floppy disks, CDs, DVDs, magnetic storage devices, tape drives, device buffers, and so forth. A memory is not a propagating electrical signal divorced from underlying hardware and is thus non-transitory. The memory 150 includes program memory 160 that contains programs and software, such as an operating system 161, reduced policy creator 162, and any other application programs 163. The memory 150 also includes data memory 170 that includes any configuration data, settings, user options and preferences that may be needed by the program memory 160 or by any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, e-readers, multiprocessor systems, microprocessor-based systems, set-top boxes, programmable consumer electronics, network PCs, minicomputers, mainframe computers, distributed computing environments that include any of the above systems or devices, and the like.

Figure 2:
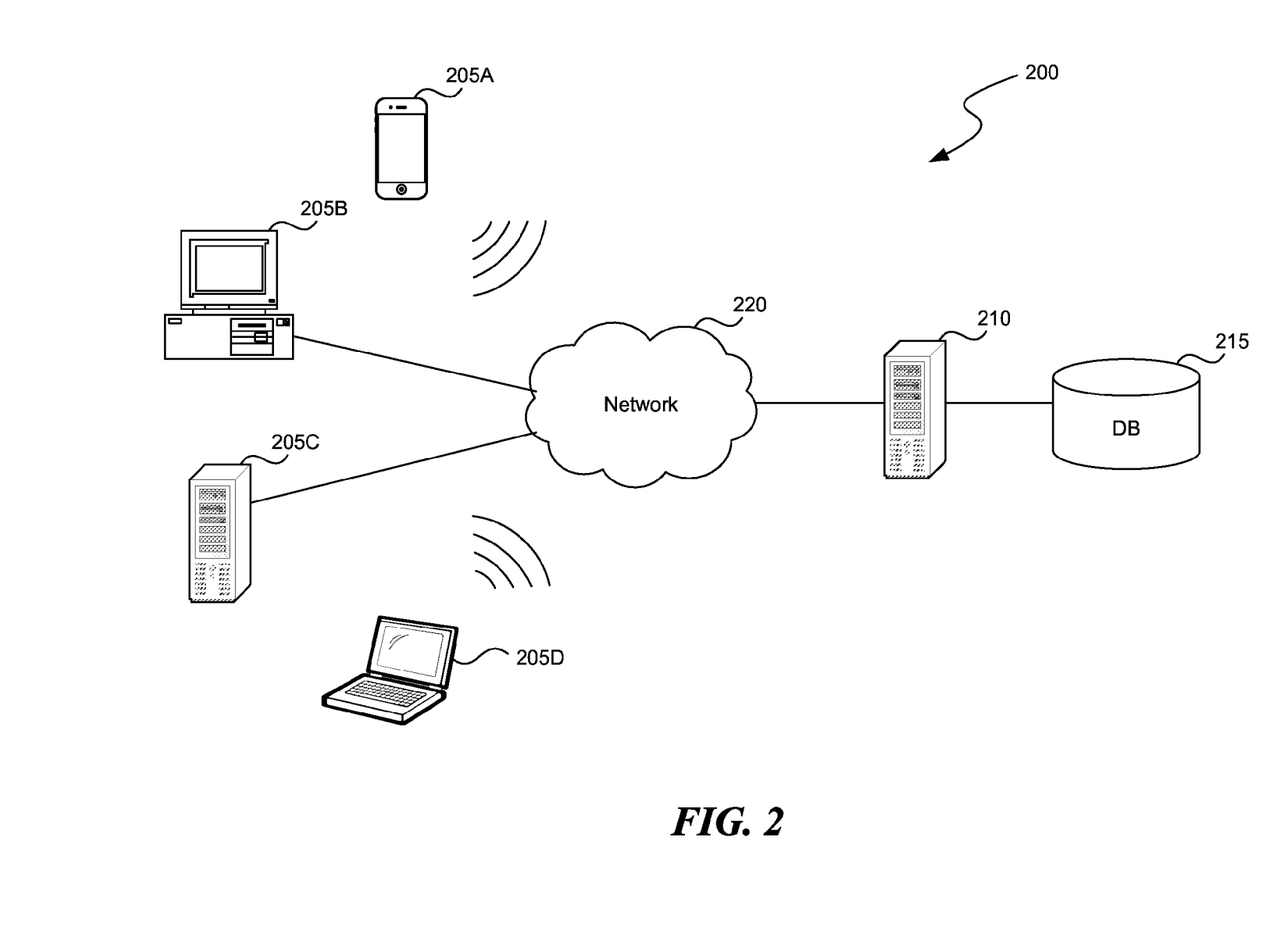
FIG. 2 is a block diagram illustrating an overview of an environment in which some embodiments of the disclosed technology may operate.

FIG. 2 is a block diagram illustrating an overview of an environment 200 in which some embodiments of the disclosed technology may operate. An environment for implementing the technology may include client computing devices 205, illustrated here as client computing devices 205A-D, an example of which may include device 100. Client computing devices 205 may operate in a networked environment using logical connections to one or more remote computers such as server computing device 210 through network 220. Client computing devices 205 and server computing device 210 may each act as a server or client to other server/client devices. Server 210 may connect to a database 215. Database 215 may warehouse information such as tables mapping rules for reduced execution in particular circumstances and cost/probability information from real world observations, benchmarking, or calculations such as the size of a data set corresponding to a particular rule.

Network 220 can be a local area network (LAN) or a wide area network (WAN), but may also be other wired or wireless networks. The client computing devices 205 can be connected to network 220 through a network interface, such as by a wired or wireless network.

Figure 3:
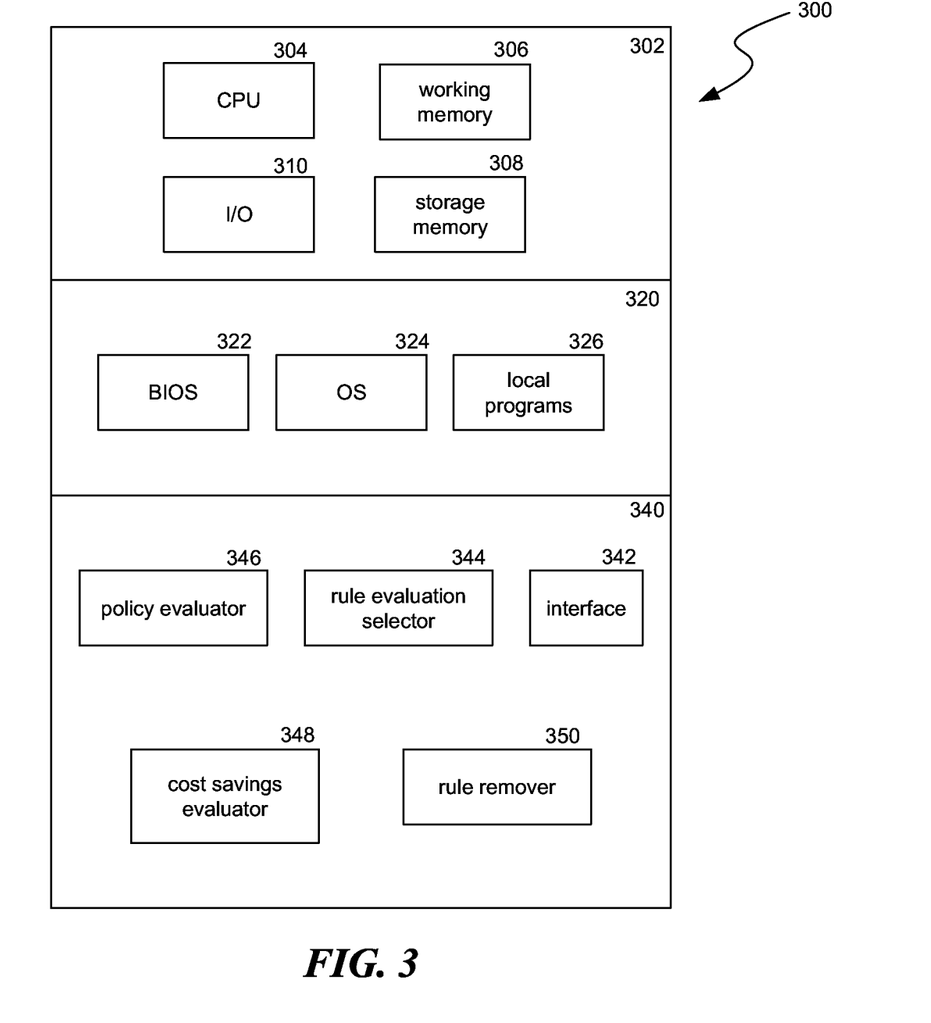
FIG. 3 is a block diagram illustrating components which, in some embodiments, may be used in a system implementing the disclosed technology.

FIG. 3 is a block diagram illustrating components 300 which, in some embodiments, may be used in a system implementing the disclosed technology. The components 300 include hardware 302, general software 320, and specialized components 340. As discussed above, a system implementing the disclosed technology may use various hardware including a central processing unit 304, working memory 306, storage memory 308, and input and output devices 310. Components 300 may be implemented in a client computing device such as client computing devices 205 or on a server computing device, such as server computing device 210.

General software 320 may include various applications including a BIOS 322, an operating system 324, and local programs 326. Specialized components 340 may be subcomponents of a general software application 320, such as of a local program 326. Specialized components 340 may include interface 342, rule evaluation selector 344, policy evaluator 346, cost savings evaluator 348, and rule remover 350.

An ordered set of rules and parameters for creating reduced policies may be received by interface 342. Interface 342 may receive rules and parameters from any of components 302 or 320, such as when a developer runs a command or when an automated optimization job is scheduled. Rule evaluation selector 344 may receive an ordered set of rules through interface 342 and choose one or more sets of candidate rules to be analyzed for removal. In some embodiments, rule evaluation selector 344 may select every possible combination of rules in the policy. In other embodiments, rule evaluation selector 344 may select less than every possible grouping, such as by selecting rule groups determined more likely to satisfy reduction parameters and/or to not violate policy conditions. Selecting one or more groups of rules to analyze is discussed in more detail below in relation to FIG. 5.

Policy evaluator 346 may receive selected candidate rule sets from rule evaluation selector 344 and determine the cascade rules from the policy for each candidate rule set. Determining cascade rules is discussed in more detail below in relation to FIG. 5.

Cost savings evaluator 348 may determine one or more cost-saving values identifying the cost savings for removing that set. The cost savings values may be for one or more of the sets of candidate rules from rule evaluation selector 344 or for one or more of the sets of candidate rules combined with their associated cascade rules from policy evaluator 346. The cost-saving values may indicate a percentage, a total value, or other metric for quantifying the cost savings of removing a particular set of rules. In addition, the cost savings values may be in terms of the maximum cost of evaluating the policy, the expected cost of evaluating a policy, or another basis for comparing rule removal savings. Determining the cost savings is discussed in more detail below in relation to FIG. 5.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. Some processes described below may use recursive algorithms. Those skilled in the art will further appreciate that equivalent implementations may be created with or without recursion.

Figure 4:
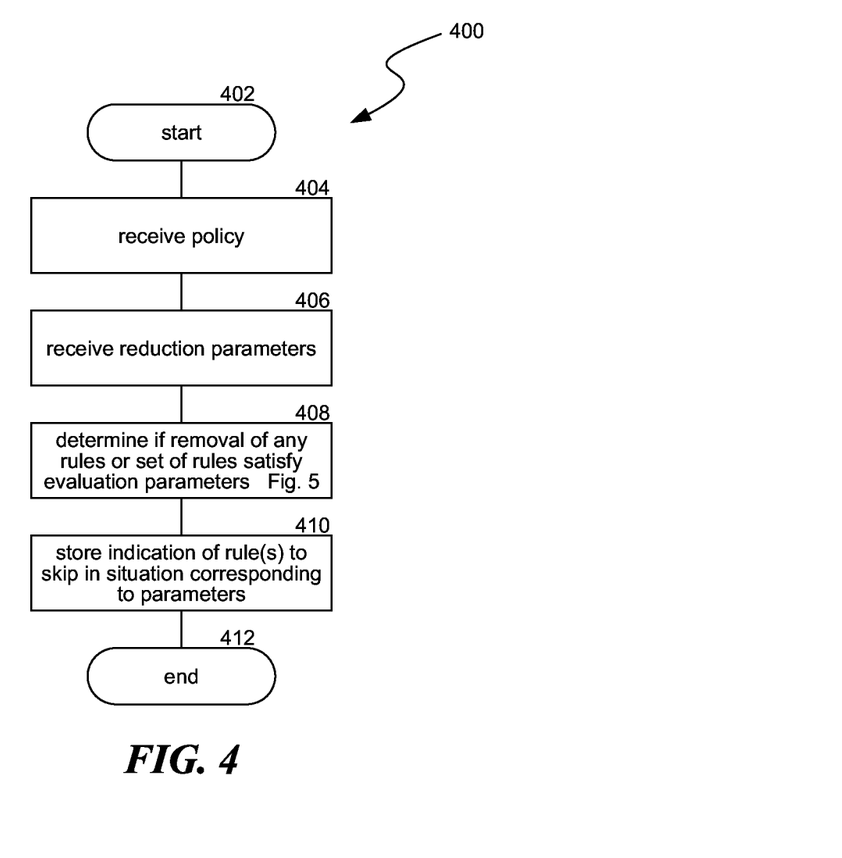
FIG. 4 is a flow diagram illustrating a process used in some embodiments for removing policy rules to improve efficiency.

FIG. 4 is a flow diagram illustrating a process 400 used in some embodiments for removing policy rules to improve efficiency. The process begins at step 402, then continues to step 404.

At step 404, the process receives a policy. As discussed above, a policy may be an ordered set of rules where the first rule in the order that applies controls the outcome of the policy, and the outcome may correspond to one of a predetermined set of possible outcomes. In some implementations, a rule that applies is one where a condition associated with the rule evaluates to a particular result, such as true. For example, a policy may have three rules. A first rule, allowIfOriginator, may be associated with a condition that evaluates to true if the piece of content associated with the policy was originated by the current user. A second rule, allowIfFriendOfOriginator, may be associated with a condition that evaluates to true if the piece of content associated with the policy was originated by a friend of the current user. A third rule, denyIfBlocked, may be associated with a condition that evaluates to true if the user who originated the piece of content associated with the policy has blocked the current user. In this example, the first rule will control the outcome if the current user is the originator of the content, regardless of other rule outcomes, the second rule will control the outcome if the current user is a friend of the originator of the content, regardless of the third rule outcome, and the third rule will control the outcome if the current user has been blocked by the originator of the content. In this example, no rule is specified that controls the situation where no other rule applies. In some implementations this may result in a universal default rule being logically appended such as denyAll or allowAll or may result in another action such as denyAndThowException. The process then continues to step 406.

At step 406, the process receives a set of parameters. As discussed above, the parameters may include reduction parameters or policy conditions. Reduction parameters may specify an objective for policy reduction, such as reducing expected policy evaluation by 30%. Policy conditions may limit how policy reduction may be accomplished, such as identifying certain rules or rule types that may not be removed. The process then continues to step 408.

At step 408 the policy determines if any subset of rules of the received policy satisfy the reduction parameters while not violating the policy conditions. In some implementations, this may comprise eliminating only those rules necessary to meet the reduction parameters, and thereby reduce false negatives and/or false positives. In some implementations, determining this subset of rules may comprise eliminating as many of the most costly rules as possible without violating the policy conditions, and thereby reduce maximum or expected policy evaluation costs. One implementation of this process is discussed in more detail below in relation to FIG. 5. Once the process determines whether and what subset of rules may be eliminated, the process continues to step 410.

At step 410, the process stores an indication of the determined rules. In some implementations, this comprises creating one or more reduced rule copies of the policy. In other implementations, this comprises creating some indication that particular rules from the determined subset of rules should be skipped in particular circumstances. In some implementations, this is accomplished by creating entries in a database that correlate rules from the determined subset to particular situations where those rules may be skipped. Conversely, the stored indication may correlate rules not in the determined subset to situations where those rules may not be skipped. In some implementations, the particular conditions may be identified by another of the received parameters. When the indication of the determined rules is stored, the process continues to step 412, where it ends.

Figure 5:
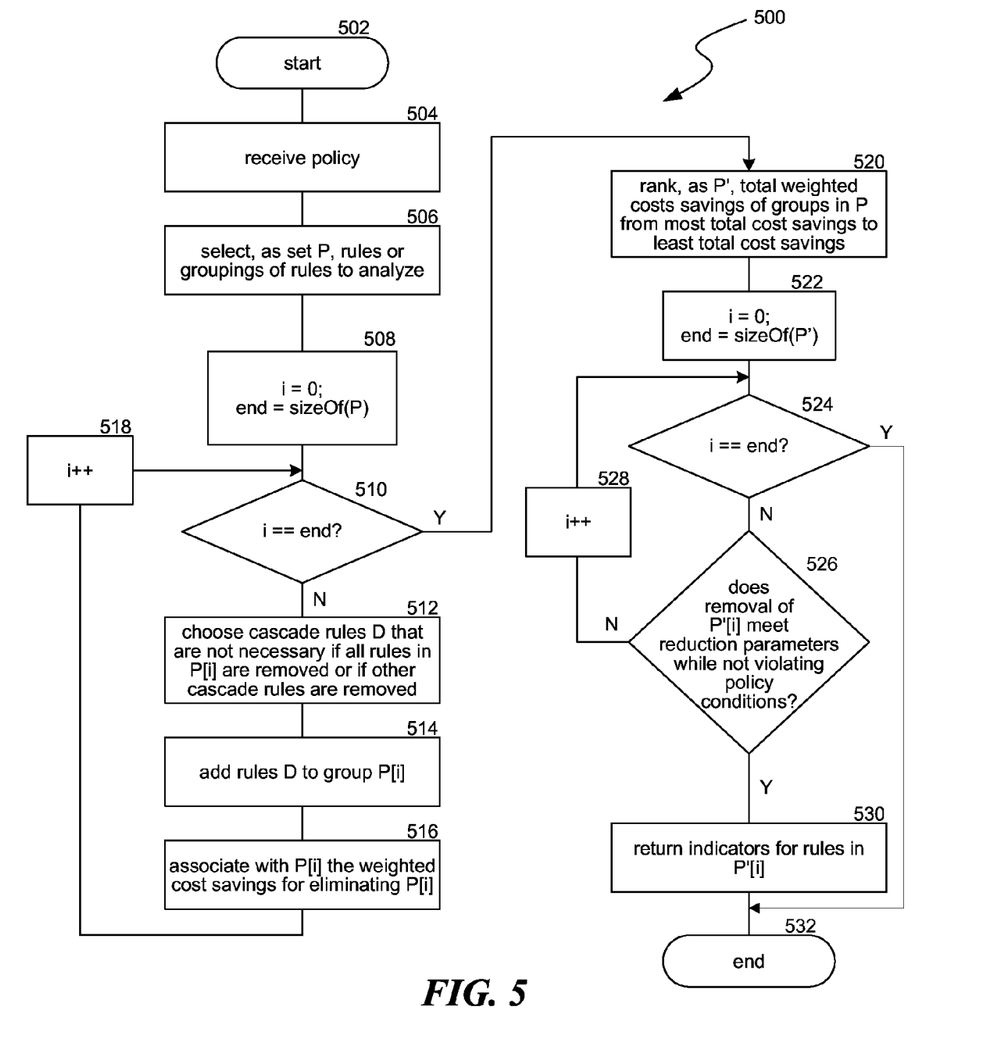
FIG. 5 is a flow diagram illustrating a process used in some embodiments for selecting rules to be removed based on reduction parameters and policy conditions.

FIG. 5 is a flow diagram illustrating a process 500 used in some embodiments for selecting rules to be removed based on reduction parameters and policy conditions. The process begins at step 502, then proceeds to step 504.

At step 504, the process receives a policy. As discussed above, a policy may be an ordered set of rules where the first rule in the order that applies controls the outcome of the policy, and the outcome may correspond to one of a predetermined set of possible outcomes. In some implementations reduction parameters and policy conditions may also be received. The process then continues to step 506.

At step 506, the process selects, as a set P, one or more groups of rules to analyze for removal from the policy. In some implementations, the groupings may be overlapping. For example, a policy with rules A, B, C, D, and E may select groups {B, D, E}, {C}, {A}, {D, E}, and {A, B} as groups to analyze for removal. In some implementations, every possible grouping of rules may be selected. In other implementations only groupings that do not violate policy conditions, are likely to satisfy reduction parameters, or both, may be selected. In yet further implementations, other groupings may be selected such as random groupings, groupings that include one or more rules previously identified as removal candidates, or groupings based on other characteristics of the rules such as execution cost or probability of being applied. The process then continues to step 508.

As discussed above, steps in this process may be reorganized. For example, in some implementations, step 506 may be performed within the loop created between steps 510 and 518, such that instead of selecting all of the groups to be analyzed at one time, groups may be selected one at a time and then analyzed before the next group is selected. In this implementation the ending condition for the loop between steps 510 and 518 may be changed to be when no more groups are found, when reduction is complete, or some other ending condition. In some implementations, process 500 may be repeated, selecting one group in step 506 during each iteration of the process.

At step 508, the process sets a counter variable "i" to 0, and sets a variable "end" to the number of groupings selected in step 506. The process then continues to step 510.

At step 510, the process determines whether the value of variable i is equal the value of variable end. If true, this signifies that the loop between steps 510 and 518 has cycled through each of the groupings selected in step 506. When true, the process continues to step 520. If false, the process has additional groupings to cycle through, and therefore continues to step 512.

At step 512, the process determines cascade rules, D, that are redundant if the rules in group P[i] are removed. As discussed above, cascade rules are those rules which may be removed from a policy without increasing the potential for false positives or false negatives. In some implementations, the cascade rule set selected for rules P[i] may be limited to rules whose removal, when combined with grouping P[i], would not violate policy conditions. For example, a policy with rules denyKnownSpammers, allowWhiteList, denyBlackList, and allowAll, where the current grouping P[i] is {denyBlackList}, rule allowWhiteList may be a cascade rule for the P[i] set. However, the policy conditions may specify allowWhiteList as a necessary rule and therefore it may not be included in the cascade rule set. In other implementations, the removal of cascade rules may be permitted to violate the policy conditions. For example, a policy with rules denyKnownSpammers, allowWhiteList, denyBlackList, and allowAll, where the policy conditions specify that allowWhiteList may not be removed, but where denyBlackList is chosen for removal, because allowWhiteList is completely subsumed by the allowAll rule it may be removed despite it being a violation of the policy conditions. Once the cascade rules are determined, the process then continues to step 514.

At step 514, the process adds the determined cascade rules the to the group P[i]. Therefore, group P[i] now has the rules selected in step 506, as well as the rules from the cascade rule set, chosen in step 512. The process then continues to step 516.

At step 516, the process calculates a value for a cost savings achieved by removing the rules in P[i]. In some implementations, each policy rule may be associated with a data fetch cost and/or evaluation cost. In some implementations, each policy rule may be associated with a probability indicating the likelihood that the rule applies, or the likelihood that the rule applies in various circumstances. In some implementations, determining the actual cost of a particular rule is accomplished by adding the evaluation cost of that rule with the data fetch cost*N, where N is a value corresponding to an amount of time determined for one round trip to a server from which the data fetch is being requested. In some implementations, the cost savings value may be the sum of the total data fetch cost for all the rules in P[i]*N and the total evaluation cost for all the rules in P[i]. In some implementations, the cost savings value may be an expected cost savings, which may be determined by adding the result of, for each rule in P[i], the sum of the data fetch cost*N and the evaluation cost, multiplied by a probability indicating the likelihood the rule will apply which may be expressed as $\Sigma_{n=0}^{all\ rules\ in\ group\ P[i]}$(dataFetchCost(rule[n])*N+executionCost(rule[n]))*likelihood(rule[n]).

The process then continues to step 518, where variable i is incremented by one. The process then returns to step 510. When the process has iterated though all the rule groups, i will equal end, and the process will continue from step 510 to step 520.

At step 520, the process creates P' by organizing the groups in P from most cost savings to least cost savings according to the cost savings value associated with each P[i] calculated in step 516. The process then continues to step 522.

At step 522, the process sets the counter variable i to 0, and sets variable end to the number of groupings in P'. The process then continues to step 524.

At step 524, the process determines whether i is equal to end. If true, this signifies that the loop between steps 524 and 528 has cycled through each of the groupings in P'. When true, the process continues to step 532. If false, the process has additional groupings to cycle through, and therefore continues to step 526.

At step 526, the process determines whether removal of grouping P'[i] satisfies the reduction parameters while not violating the policy conditions. As discussed above in relation to step 512, in some implementations the determination of whether a grouping does not violate the policy conditions may be limited only to the candidate rules in the grouping or may exclude removal of one or more of the cascade rules. By looping through the groupings P', starting with the one that gives the most cost savings, the grouping that meets the reduction parameters and does not violate the policy conditions while providing the most cost savings is determined. If a grouping is found that satisfies the reduction parameters while not violating the policy conditions, the process continues to step 530.

At step 530, the process returns the grouping P'[i] that was discovered in step 526 that provides the most cost savings while meeting the reduction parameters and not violating the policy conditions. The process then continues to step 532 where it ends.

If, at step 526, removing grouping P'[i] either does not meet the reduction parameters or violates the policy conditions, the process continues to step 528. At step 528 i is incremented by one. This causes the loop between steps 524 and 528 to operate on the next grouping of P'. If the loop between steps 524 and 528 cycles through all the groupings of P' without finding a grouping that meets the reduction parameters while not violating the policy conditions, the process continues from step 524 to step 532, where it ends.

Figure 6:
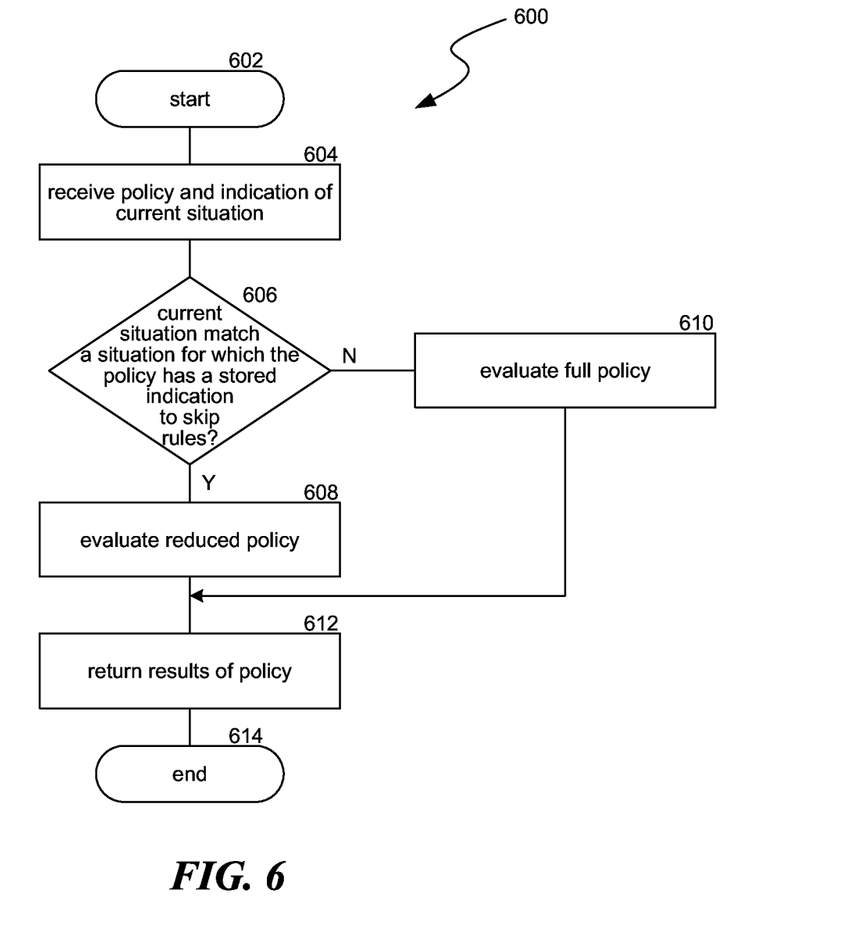
FIG. 6 is a flow diagram illustrating a process used in some embodiments for selecting whether to use a full policy or a reduced policy.

FIG. 6 is a flow diagram illustrating a process 600 used in some embodiments for selecting whether to use a full policy or a reduced policy. The process starts at step 602, then continues to step 604. At step 604, the process receives an indication of a policy and an indication of a current situation. The process then continues to step 606.

At step 606, the process determines whether the indicated current situation matches a situation previously indicated as desirable to use reduced policies. Alternatively, step 606 may determine whether a reduced version of the indicated policy has been created for the current situation. If so, the process continues to step 610, otherwise the process continues to step 608.

At step 610, the full version of the policy is evaluated. At step 608, the reduced version of the policy determined in step 606 is evaluated. The process then continues to step 612, where the result of the evaluated policy is returned. The process then continues to step 614, where it ends.

Figure 7:
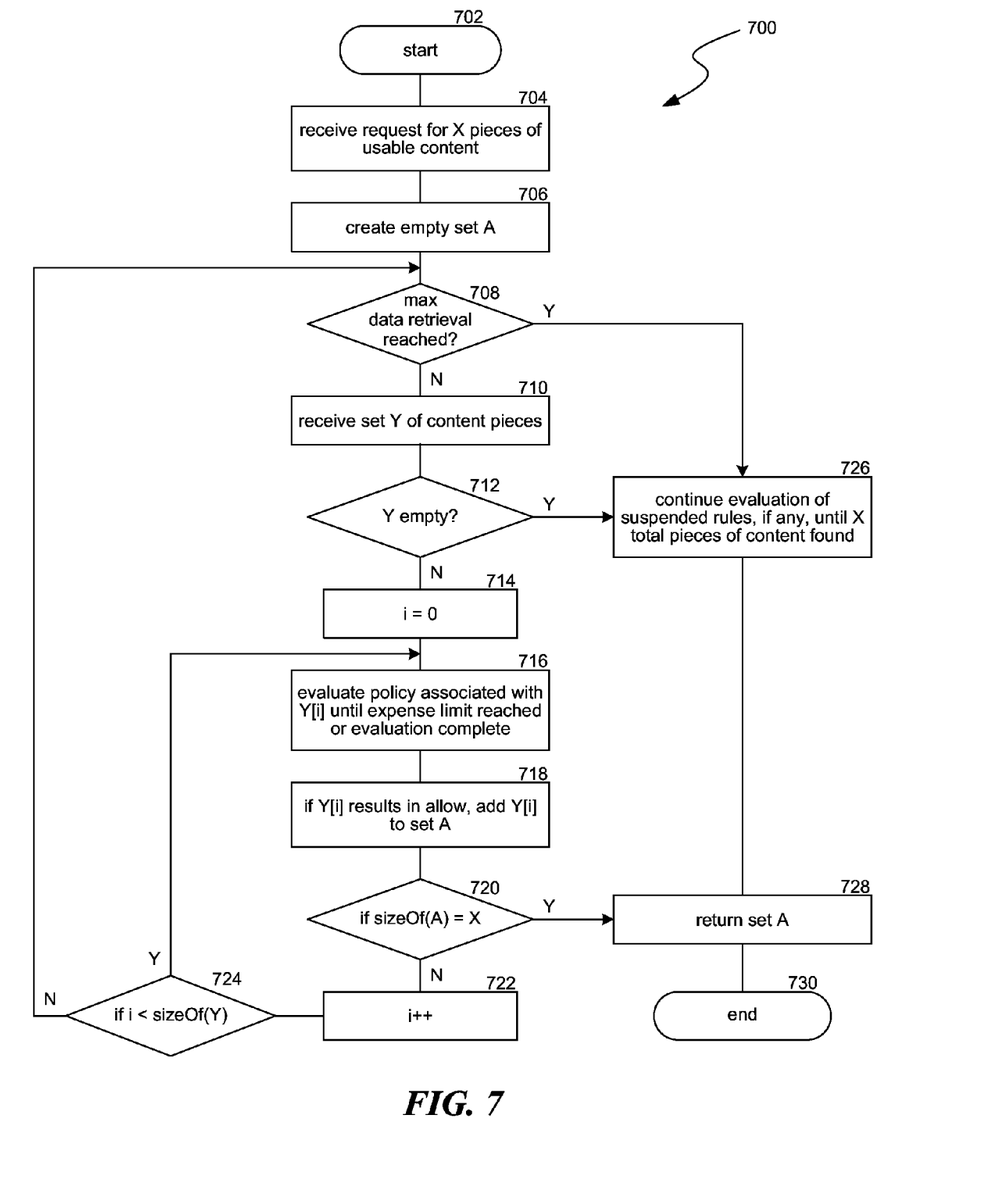
FIG. 7 is a flow diagram illustrating a process used in some embodiments for selecting a given number of elements from a larger set using rule evaluation suspension.

FIG. 7 is a flow diagram illustrating a process 700 used in some embodiments for selecting a given number of elements from a larger set using rule evaluation suspension. This process may be used when an end user is viewing a portion of a webpage where the page creator indicated that a particular number of content items matching a set of criteria should be displayed, but particular content items are not specified. For example, when a user enters a string into a search field, the string may match many thousands of content items, however the developer has indicated that only 50 of the content items will be displayed by the page returned to the user as search results.

This process may retrieve a set of potential content items and begin evaluation of the policies for the retrieved content items. Policy evaluation may begin on each of the retrieved content items. Some content item policies may be evaluated quickly, and if resulting in an allow, the corresponding content items may be added to a set of display content items. However, if evaluation of a particular policy takes too long, policy evaluation for that policy may be suspended. The retrieval and evaluation process may be repeated until the desired number of content items are selected. In some cases, it may be determined that, instead of continuing to retrieve additional content item sets, it may be more efficient to resume evaluation of suspended policy evaluations. This may be true, for example, where a threshold corresponding to a likelihood that the content items with a simple policy have been exhausted. The process begins at step 702, then proceeds to step 704.

At step 704, a request for some number X pieces of content is received. The request may also specify a criteria for the content. Continuing the previous example, a search from a user with the string "Chantel" may result in 20,000 results, however the results page is only designed to show the first 50 results. A request may be made for 50 results matching the search criteria "Chantel." The process then continues to step 706.

At step 706, the process creates an empty set A. Set A is created to be the result set containing up to X content items matching the criteria. The process then continues to step 708.

At step 708, the process determines whether a maximum data fetch value has been reached. The maximum data fetch value may be pre-set by a system administrator or the developer of the current page or it may vary based on server response time or network usage. The maximum data fetch value may be in terms of total quantity of retrieved content items, total size of retrieved content items or total amount of time used to retrieve content items. The maximum data fetch value may be based on a likelihood that policies will result in an allow, may be context specific, and may be based on an evaluation of the likely complexity of policies for the specific context. In the above example, while there may be 20,000 potential results matching the string "Chantel," it may be determined that after the first 1,000 retrieved content items, it is unlikely that additional policies will result in an allow. Accordingly, a threshold maximum data fetch value may be set to 1,000 items, because it is more likely to be cost effective to continue to evaluate the more expensive policies that may result in an allow than to continue to retrieve potential content items where an allow is less likely. If the maximum data fetch value has been reached, the process continues to step 726. If the maximum data fetch value has not been reached, the process continues to step 710.

At step 710, a set Y of potential data items that match the content criteria is retrieved. In some embodiments, queries for content items are executed such that content items are retrieved based on a current context. For example, if the context is a user "Timeline" page, content items may be selected in content retrievals for step 710 starting with those that are more likely to result in an allow for this context. The number of items in set Y may be determined based on a pre-determined likelihood of policies resulting in an allow. For example, if, for the current context, policies generally result in an allow 25% of the time, and the desired number of content items is 50, then it is likely that a selection of 200 content items will result in 50 that are allowable. The number of items received in set Y may be increased based on a determined probability that a certain number of policies may be too complex to be evaluated without being suspended. For example, while policies in the current context may result in an allow 25% of the time, only half of those policies may be simple enough to evaluate completely before the process suspends evaluation of those policies. Therefore, 400 content items may be retrieved in set Y because this is the amount of content items that are likely needed to quickly determine an allowed set of 50 content items. After receiving set Y, the process continues to step 712.

At step 712, the process checks whether set Y is empty, meaning the supply of content items matching the content criteria has been exhausted. If this is the case, the process continues to step 726. If there are content items in set Y, the process continues to step 714, where counter variable i is set to 0. The process continues from step 714 to step 716.

At step 716, the process begins evaluation of the policy corresponding to the content item at position i in set Y, referred to as Y[i]. Evaluation of policy Y[i] will continue until a result is reached or an evaluation limit is reached, whichever occurs first. In some embodiments, an evaluation limit may be specified by a webpage developer. In some embodiments, an evaluation limit may be specified for an entire system or subset of webpages in a system by a system administrator. In some embodiments, an evaluation limit may be dynamically set by a computing system based on conditional variables such as current server utilization, network latency, and webpage context variables, such as the time required to build other aspects of the webpage requested by the user. The evaluation limit may be specified in a time amount, a number of operations, or a number of policy rules that may be evaluated. Evaluation of a policy may be evaluation of a full policy or may be evaluation of a reduced policy, such as a policy created by process 400. Determination of whether to use a full policy or a reduced policy may be made through process 600. Once the Y[i] policy has been evaluated or suspended, the process continues to step 718.

At step 718, if the Y[i] policy evaluated to an allow result, this indicates that it is an allowed content item that matches the content criteria, and therefore content item Y[i] is added to result set A. The process then continues to step 720.

At step 720, the process checks whether the number of items in set A match the desired number of content items X. If so, then enough content items have been found and the process continues to step 728. If the number of content items in result set A does not meet the requested X pieces of content, the process continues to step 722. At step 722, counter i is incremented by one. The process then continues to step 724.

At step 724 the process determines if i is less than the number of content items Y retrieved in step 710. If so, then at least one of the content items in Y have not been analyzed. When any content items in Y have not been analyzed the process loops through steps 716 to 724 until either X content items have been found or all content items in Y have been analyzed. If, at step 724, all content items in Y have been analyzed the process continues to step 708 to repeat the loop between steps 708 and 724 until one of: X content items have been found in step 720, no more content items are retrieved in step 712, or the maximum data retrieval value has been reached in step 708.

At step 726 either the maximum data retrieval value has been reached (from step 708) or no more content items have been retrieved (from step 712). In addition, the requested number of content items X has not been found. At this point the process continues evaluation of policies that were previously suspended in step 716. When a previously suspended policy evaluates to an allow result, the corresponding content item is added to result set A. The suspended policies are evaluated until either no more suspended policies are available or X content items have been found, whichever occurs first. The process then continues to step 728.

At step 728, result set A is returned. In some cases the number of items in result set A may be less than the number of content items X requested. The process then continues to step 730, where it ends.

While FIGS. 8 and 9, discussed below, show tables whose contents and organization are designed to make them more comprehensible by a human reader, those skilled in the art will appreciate that actual data structures used by the facility to store this information may differ from the table shown, in that they, for example, may be organized in various other ways; may contain more or less information than shown; may be compressed and/or encrypted; etc.

Figure 8:
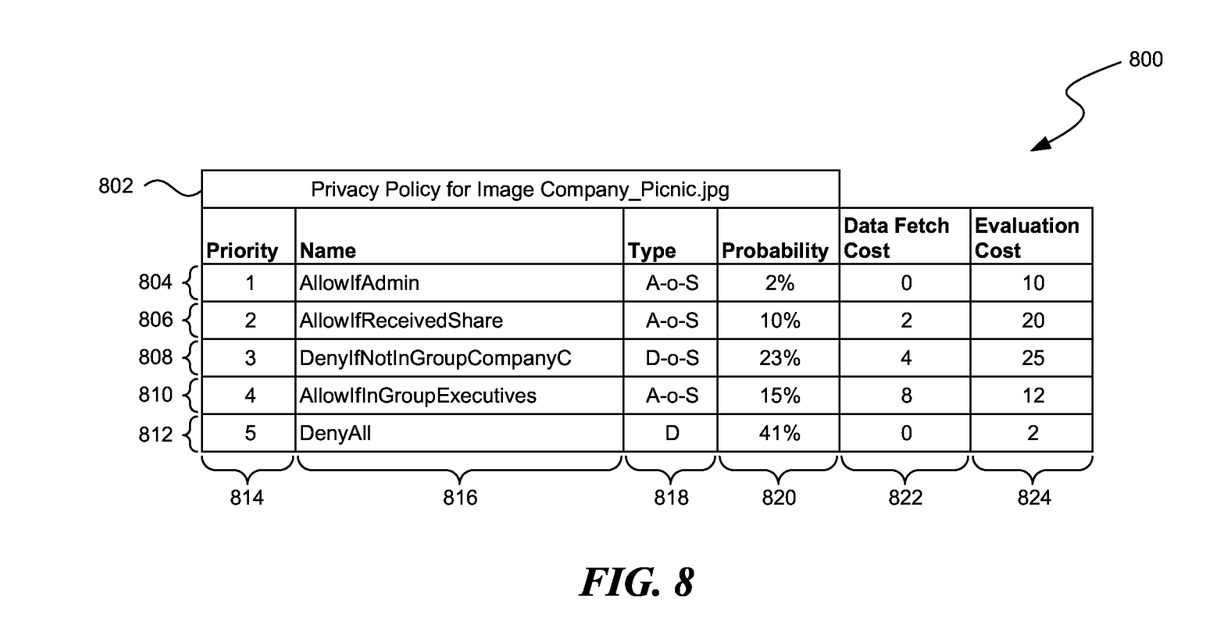
FIG. 8 illustrates an example of a policy of ordered rules that may be used to create one or more reduced policies using the disclosed technology.

FIG. 8 illustrates an example of a policy 800 of ordered rules that may be used to create one or more reduced policies using the disclosed technology. Policy 800 is associated with a particular portion of content: Company_Picnic.jpg, as illustrated in block 802. Policy 800 has a number of properties associated with each rule in the policy. Column 814 identifies a priority value for each rule. Column 816 identifies a name for each rule. Column 818 identifies the type associated with each rule. In this example, the possible types are allow-or-skip (A-o-S), deny-or-skip (D-o-S), allow-always (A), and deny-always (D). Column 820 identifies a probability that each rule will not skip; the items in this column may add up to more than, less than, or equal to 100%. Column 822 identifies a value that, when multiplied by N, provides a data fetch cost associated with each rule, where N is a value corresponding to an amount of time determined for one round trip to a server from which the data fetch is being requested. Column 824 identifies an evaluation cost associated with each rule. In this example, there are five rules, listed in rows 804-812. The values in one or more of columns 820, 822, and 824 may be context specific. For example, the probability that a rule may not skip may be more likely in a Timeline context versus in a Search context. The context for each value may also be stored, such as in an additional column, now shown.

Figure 9:
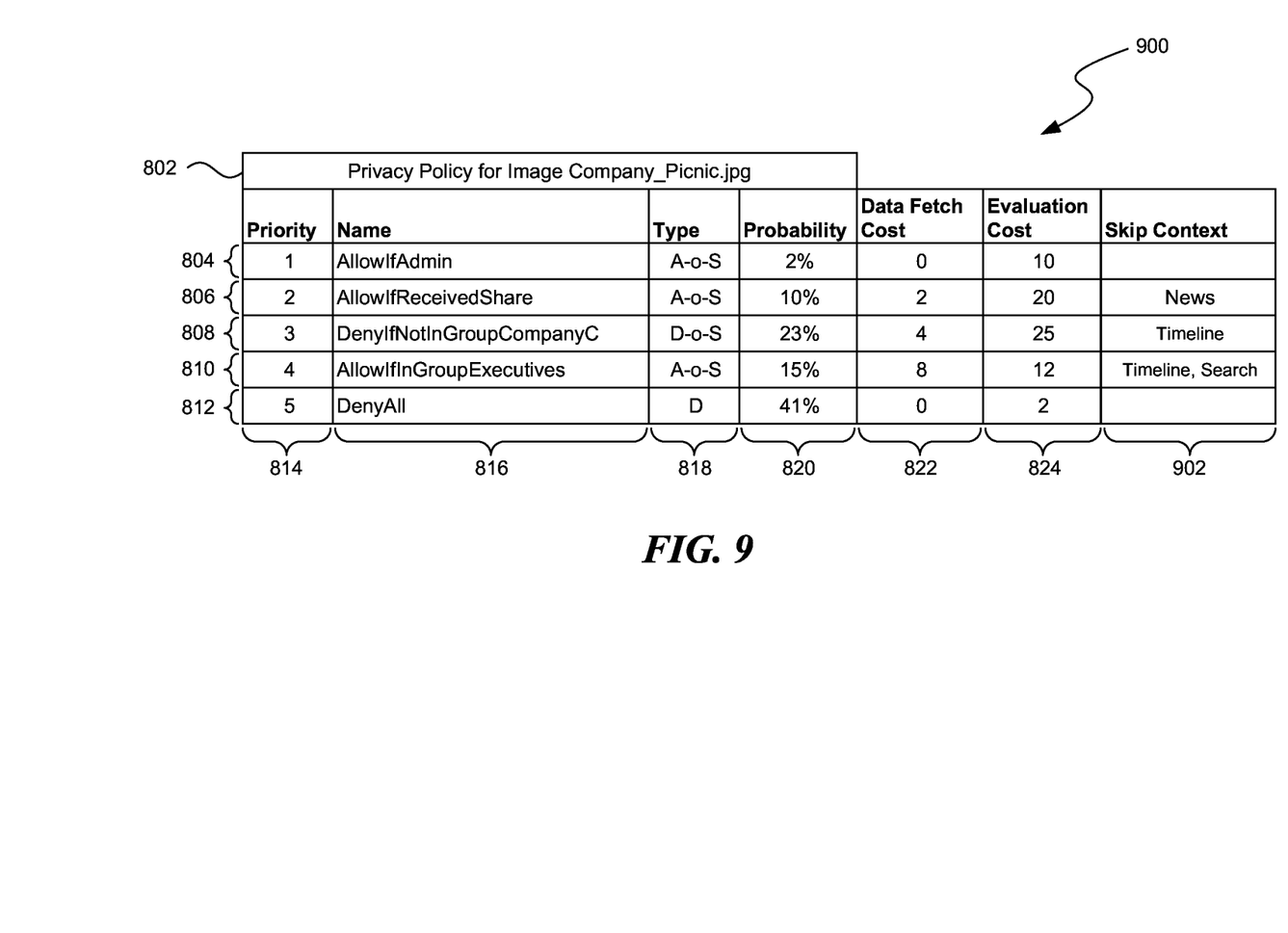
FIG. 9 illustrates an example of some reduced policies that may be created using the disclosed technology for the example policy of FIG. 8.

FIG. 9 illustrates an example 900 of reduced policies that may be created using the disclosed technology for the example policy of 800. In this example, reduced policies are stored by indicating, for one or more rules of the policy, a context where that rule may be skipped, stored in column 902. Example 900 illustrates three reduced policies, one corresponding to each of contexts "News," "Timeline," and "Search."

In the News reduced policy, the AllowIfReceivedShare rule in row 806 may be skipped. This reduced policy may result where the policy conditions both prohibit removal of deny type rules and specify that the rule, in rows 810 and 804 are identified as non-removable and where the reduction parameters specify that policy reduction should result in an expected cost savings of at least 3 units. Due to the policy conditions, only the rule in row 804 is eligible for removal. Removal of the AllowIfReceivedShare rule does not result in any cascade rules both because removal of any other rules would violate the policy parameters and because removal of the AllowIfReceivedShare does not render any other rules duplicative. The expected cost savings (ESC) for removing the AllowIfReceivedShare is:

ESC(AllowIfReceivedShare)=probabilityOfRule-NotSkipping(AllowIfReceivedShare)*(N*dataFetch(AllowIfReceivedShare)+evaluationCost(AllowIfReceivedShare))

If N, the value corresponding to an amount of time determined for one round trip to a server, is 10, ESC(AllowIfReceivedShare)=0.1*(10*2+20)=4. Removal of the AllowIfReceivedShare rule, therefore, satisfies the reduction parameter that expected cost savings should be at least 3 units.

In the Timeline reduced policy, the rules DenyIfNotInGroupCompanyC and AllowIfInGroupExecutives rules from rows 808 and 810 may both be skipped. This reduced policy may result where the policy conditions for the Timeline context prohibit removal of more than one rule except that any number of cascade rules may be removed, and where the reduction parameters specify that the expected cost of the policy should be reduced as much as possible. Due to the policy conditions, groups of candidate rule sets may be restricted to one rule each. If the AllowIfInGroupExecutives rule is removed, the DenyIfNotInGroupCompanyC rule is duplicative of the DenyAll rule (however the DenyAll rule may not be duplicative of the DenyIfNotInGroupCompanyC rule). Therefore, the potential removal set {AllowIfInGroupExecutives, DenyIfNotInGroupCompanyC}, which is the potential removal set with the greatest potential cost savings while not violating the policy conditions, may be selected as the rule set to skip in the reduced policy.

In the Search reduced policy, the rule AllowIfInGroupExecutives from row 810 may be skipped. This reduced policy may result where the policy conditions for the Search context prohibit removal of Deny type rules and prohibit removal of more than one rule, except that any number of cascade rules may be removed, and where the reduction parameters specify that the expected cost of the policy should be reduced as much as possible. Due to the policy conditions, groups of candidate rule sets may be restricted to one rule each. Contrary to the Timeline reduced policy above, because the policy conditions specify that Deny type rules may not be removed, the DenyIfNotInGroupCompanyC rule, though duplicative of the DenyAll rule if the AllowIfInGroupExecutives rule is removed, is not selected as a cascade rule. Therefore, the potential removal set {AllowIfInGroupExecutives}, which is the potential removal set with the greatest potential cost savings while not violating the policy conditions, is selected as the rule set to skip in the reduced policy.

We claim:

1. A method comprising:
receiving a policy comprising at least two rules with an order indicated among the at least two rules;
receiving reduction parameters that specify a minimum amount of savings that a reduced rule policy should achieve, wherein the reduction parameters comprise one or more of:
an indication of a cost savings, as a value, that the reduced rule policy should achieve,
an indication of a cost savings, as a percentage of a calculated initial cost of the policy, that the reduced rule policy should achieve,
an indication of a cost savings amount that should be achieved by removing a selected rule, as a function of an amount of increased likelihood of false allow or false deny resulting from removing the selected rule, that qualifies the selected rule for removal, or
any combination thereof;
selecting, as a candidate rule set, one or more rules of the at least two rules, wherein the candidate rule set is removable from the policy;
determining a cascade rule set, wherein each rule of the cascade rule set is rendered duplicative by removal of:
the at least one rule of the candidate rule set, and/or
at least one rule of the cascade rule set,
wherein a combination of the candidate rule set and the cascade rule set are removable from the policy;
combining, into a result set, the candidate rule set and the cascade rule set; and
providing an indication of the rules in the result set, wherein a subsequent evaluation of the policy uses a reduced rule version of the policy that excludes the indicated rules of the result set.

2. The method of claim 1 further comprising:
receiving policy conditions associated with the policy, wherein the policy conditions specify minimum requirements that removal of candidate rules may not violate, wherein the candidate rule set and the combination of the candidate rule set and the cascade rule set are determined to be removable from the policy based on the policy conditions.

3. The method of claim 2 wherein the policy conditions comprise one or more identifications of specific rules that may not be removed.

4. The method of claim 2 wherein the policy conditions comprise an indication of a maximum number of rules that may be removed.

5. The method of claim 2 wherein the policy conditions comprise an indication of a maximum percentage of policy rules that may be removed.

6. The method of claim 1 further comprising determining that removal of the result set from the policy satisfies the reduction parameters.

7. The method of claim 2 wherein the reduction parameters or policy conditions are received from one or more pre-set defaults.

8. The method of claim 1 wherein the reduction parameters are in terms of Expected Cost Savings.

9. A computer readable memory storing instructions configured to, when executed by a computing system, cause the computing system to perform operations comprising:
receiving a policy comprising at least two rules with an order indicated among the at least two rules;
obtaining reduction parameters, the reduction parameters specifying criteria for policy reduction, wherein the reduction parameters comprise one or more of:
an indication of a cost savings, as a value, that a reduced rule policy should achieve,
an indication of a cost savings, as a percentage of a calculated initial cost of the policy, that the reduced rule policy should achieve,
an indication of a cost savings amount that should be achieved by removing a selected rule, as a function of an amount of increased likelihood of false allow or false deny resulting from removing the selected rule, that qualifies the selected rule for removal, or
any combination thereof;
obtaining policy conditions, the policy conditions specifying conditions for removing rules;
selecting, as a candidate rule set, one or more rules of the at least two rules, wherein removal of the candidate rule set does not to violate the conditions for removing rules;
determining a cascade rule set wherein each rule of the cascade rule set (A) is rendered duplicative by removal of at least one rule of the candidate rule set and/or at least one rule in the cascade rules and (B) where removal of a combination of the candidate rule set and the cascade rule set satisfies the criteria of the reduction parameters;
combining, into a result set, the candidate rule set and the cascade rule set; and
providing an indication of the rules in the result set.

10. The computer readable memory of claim 9 wherein the policy conditions comprise one or more of: identifications of specific rules that may not be removed, a maximum number of rules that may be removed, and a maximum percentage of policy rules that may be removed.

11. The computer readable memory of claim 9 wherein the reduction parameters are in terms of Expected Cost Savings.

12. A system comprising:
an interface configured to:
receive a policy comprising at least two rules with an order indicated among the at least two rules;
obtain reduction parameters, the reduction parameters specifying criteria for policy reduction, wherein the reduction parameters comprise one or more of:
an indication of a cost savings, as a value, that a reduced rule policy should achieve,
an indication of a cost savings, as a percentage of a calculated initial cost of the policy, that the reduced rule policy should achieve,
an indication of a cost savings amount that should be achieved by removing a selected rule, as a function of an amount of increased likelihood of false allow or false deny resulting from removing the selected rule, that qualifies the selected rule for removal, or
any combination thereof; and
obtain policy conditions, the policy conditions specifying conditions for removing rules;
a rule evaluation selector configured to select, as candidate rule sets, one or more groups of rules each comprising at least one of the at least two rules, wherein selecting the candidate rule sets comprises determining that, for each candidate rule set, removal of that candidate rule set does not violate the conditions for removing rules;
a policy evaluator configured to, for each distinguished candidate rule set of the candidate rule sets:
select, as a new cascade rule set, any rules of the policy that both (A) would be rendered duplicative by removal of at least one rule of the distinguished candidate rule set and/or at least one rule in the new cascade rule set and (B) where removal of a combination of the distinguished candidate rule set and the new cascade rule set satisfies the criteria of the reduction parameters; and
combine, to create a potential results set, the distinguished candidate rule set and the new cascade rule set;
a cost savings evaluator configured to evaluate relative amounts of expected cost savings among the potential result sets and select a result set based on the evaluation; and
a rule remover configured to transmit an indication of the rules in the selected result set.

13. The system of claim 12 wherein:
the policy conditions comprise one or more of: identifications of specific rules that may not be removed, a maximum number of rules that may be removed, and a maximum percentage of policy rules that may be removed.

14. The system of claim 12 wherein the rule evaluation selector selects, as the candidate rule sets, at least two groups of rules, and wherein a rule that is in at least one candidate rule set is also in at least one other candidate rule set.

15. The system of claim 12 wherein a subsequent evaluation of the policy uses a reduced rule version of the policy excluding the indicated rules in the selected result set.

16. A computer readable memory storing instructions configured to, when executed by a computing device, perform operations comprising:
receiving a policy comprising at least two rules with an order indicated among the at least two rules;
obtaining reduction parameters, the reduction parameters specifying criteria for policy reduction, wherein the reduction parameters comprise one or more of:

an indication of a cost savings, as a value, that a reduced rule policy should achieve, an indication of a cost savings, as a percentage of a calculated initial cost of the policy, that the reduced rule policy should achieve, an indication of a cost savings amount that should be achieved by removing a selected rule, as a function of an amount of increased likelihood of false allow or false deny resulting from removing the selected rule, that qualifies the selected rule for removal, or any combination thereof;

obtaining policy conditions, the policy conditions specifying conditions for removing rules;

selecting, as a candidate rule set, one or more rules of the at least two rules, wherein removal of the candidate rule set does not violate the conditions for removing rules and satisfies the reduction parameters; and providing an indication of the rules in the candidate rule set.

17. The computer readable memory of claim 16 wherein:
the policy conditions comprise one or more of: identifications of specific rules that may not be removed, a maximum number of rules that may be removed, and a maximum percentage of policy rules that may be removed.

18. The computer readable memory of claim 16 wherein selection of the candidate rule set is based on a calculation of Expected Cost Savings.

* * * * *